(12) United States Patent  
Vargantwar et al.

(10) Patent No.: US 8,737,999 B1  
(45) Date of Patent: May 27, 2014

(54) METHOD AND SYSTEM OF INTELLIGENT CELL SWITCHING

(75) Inventors: Sachin R. Vargantwar, Overland Park, KS (US); Ashvini G. Canjeevaram, Overland Park, KS (US); Manoj Shetty, Overland Park, KS (US); Siddharth S. Oroskar, Overland Park, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1411 days.

(21) Appl. No.: 12/025,608

(22) Filed: Feb. 4, 2008

(51) Int. Cl.  
*H04W 36/00* (2009.01)

(52) U.S. Cl.  
USPC ............................ 455/437; 455/436; 370/331

(58) Field of Classification Search  
USPC .................................. 455/436–437; 370/331  
See application file for complete search history.

(56) References Cited

U.S. PATENT DOCUMENTS

| | | | | |
|---|---|---|---|---|
| 7,170,871 | B2 * | 1/2007 | Eyuboglu et al. | 370/331 |
| 7,197,021 | B2 * | 3/2007 | Seo et al. | 370/335 |
| 7,542,448 | B2 * | 6/2009 | Qi et al. | 370/331 |
| 7,751,778 | B1 * | 7/2010 | Ngan | 455/11.1 |
| 2004/0033816 | A1 * | 2/2004 | Semper et al. | 455/561 |
| 2005/0124345 | A1 * | 6/2005 | Laroia et al. | 455/437 |
| 2006/0126564 | A1 * | 6/2006 | Ramanna et al. | 370/331 |
| 2006/0240830 | A1 * | 10/2006 | Ranta-aho et al. | 455/436 |
| 2006/0252428 | A1 * | 11/2006 | Agashe et al. | 455/436 |
| 2007/0076663 | A1 | 4/2007 | Qi et al. | |
| 2007/0161374 | A1 * | 7/2007 | Kienstra et al. | 455/436 |
| 2007/0249351 | A1 * | 10/2007 | An et al. | 455/436 |
| 2008/0014968 | A1 * | 1/2008 | Yoon | 455/456.5 |
| 2009/0075666 | A1 * | 3/2009 | Makhijani et al. | 455/450 |
| 2010/0020775 | A1 * | 1/2010 | Tomizu | 370/338 |
| 2010/0093386 | A1 * | 4/2010 | Damnjanovic et al. | 455/522 |

OTHER PUBLICATIONS

TIA-856 A, Telecommunications Industry association, Apr. 2004.*

* cited by examiner

*Primary Examiner* — Qun Shen (57) ABSTRACT

A method and system of controlling switching of an access terminal between cells of an access network that includes a first BTS serving a first cell and a second BTS serving a second cell. While the first BTS is receiving from the access terminal one or more consecutive requests for current service in the first cell and serving the access terminal, the second BTS receives from the access terminal a request for future service in the second cell. In response, the second BTS prepares to serve the access terminal in the second cell. After the second BTS has finished preparing, the first BTS sends to the access terminal an instruction to stop sending requests for current service in the first cell (e.g., a DRCLock bit message). The second BTS then receives from the access terminal a request for current service in the second cell, and begins serving the access terminal.

21 Claims, 5 Drawing Sheets

METHOD AND SYSTEM OF INTELLIGENT CELL SWITCHING

FIELD OF THE INVENTION

The present invention relates to wireless communication, and more particularly to coverage-area switching in a wireless communication system.

BACKGROUND

In a typical cellular radio communication system, an area is divided geographically into a number of wireless coverage areas such as cells and sectors, each defined by a radiation pattern from one or more base station antennae of an access network. As an access terminal moves between coverage areas of the access network, when network conditions change, or for other reasons, the access terminal may switch from operating in one coverage area to operating in another coverage area. In a usual case, this switching process is triggered by the access terminal monitoring the signal strength of signals that it is receiving in various available coverage areas of the access network, and the access terminal and/or a radio network controller (RNC) determining when one or more threshold criteria are met.

In one typical example, the access terminal may monitor signal strength in various available coverage areas and then decide to switch to a new sector when the new sector has a signal strength that is sufficiently higher than the sector in which the access terminal is currently operating. The access terminal may then notify the access network of its decision to switch sectors. In turn, the access network may carry out the access terminal's decision to switch sectors by ending service of the access terminal in the current sector and beginning service of the access terminal in the new sector. While this arrangement generally works well to facilitate seamless service of the access terminal as it moves between wireless coverage areas, delays may occur during the switching process, impacting throughput. Accordingly, a more efficient process of controlling switching of access terminals between coverage areas is desired.

OVERVIEW

In one embodiment, the present invention may take the form of a method for controlling switching of an access terminal between coverage areas of an access network The method may include (a) a first BTS receiving, from an access terminal operating in a first coverage area, one or more consecutive requests for current service in the first coverage area, where the first BTS begins serving the access terminal in the first coverage area in response to receiving a first such request, (b) while the first BTS is receiving the one or more consecutive requests for current service in the first coverage area, a second BTS receiving from the access terminal a request for future service in a second coverage area and responsively preparing to serve the access terminal in the second coverage area, (c) the first BTS sending to the access terminal an instruction to stop sending requests for current service in the first coverage area after the second BTS has finished preparing to serve the access terminal, and (d) the second BTS receiving from the access terminal one or more consecutive requests for current service in the second coverage area after the first BTS sends the instruction, where the second BTS begins serving the access terminal in the second coverage area in response to receiving a first such request.

In one example, each of the requests for current service in the first coverage area will be a group of consecutive IS-856 Data Rate Control (DRC) messages specifying the first coverage area, the request for future service in the second coverage area will be a group of consecutive IS-856 Data Source Control (DSC) messages specifying the second coverage area, the instruction to stop sending requests for current service in the first coverage area will be an IS-856 DRCLock bit message, and each of the requests for current service in the second coverage area will be a group of consecutive IS-856 DRC messages specifying the second coverage area.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
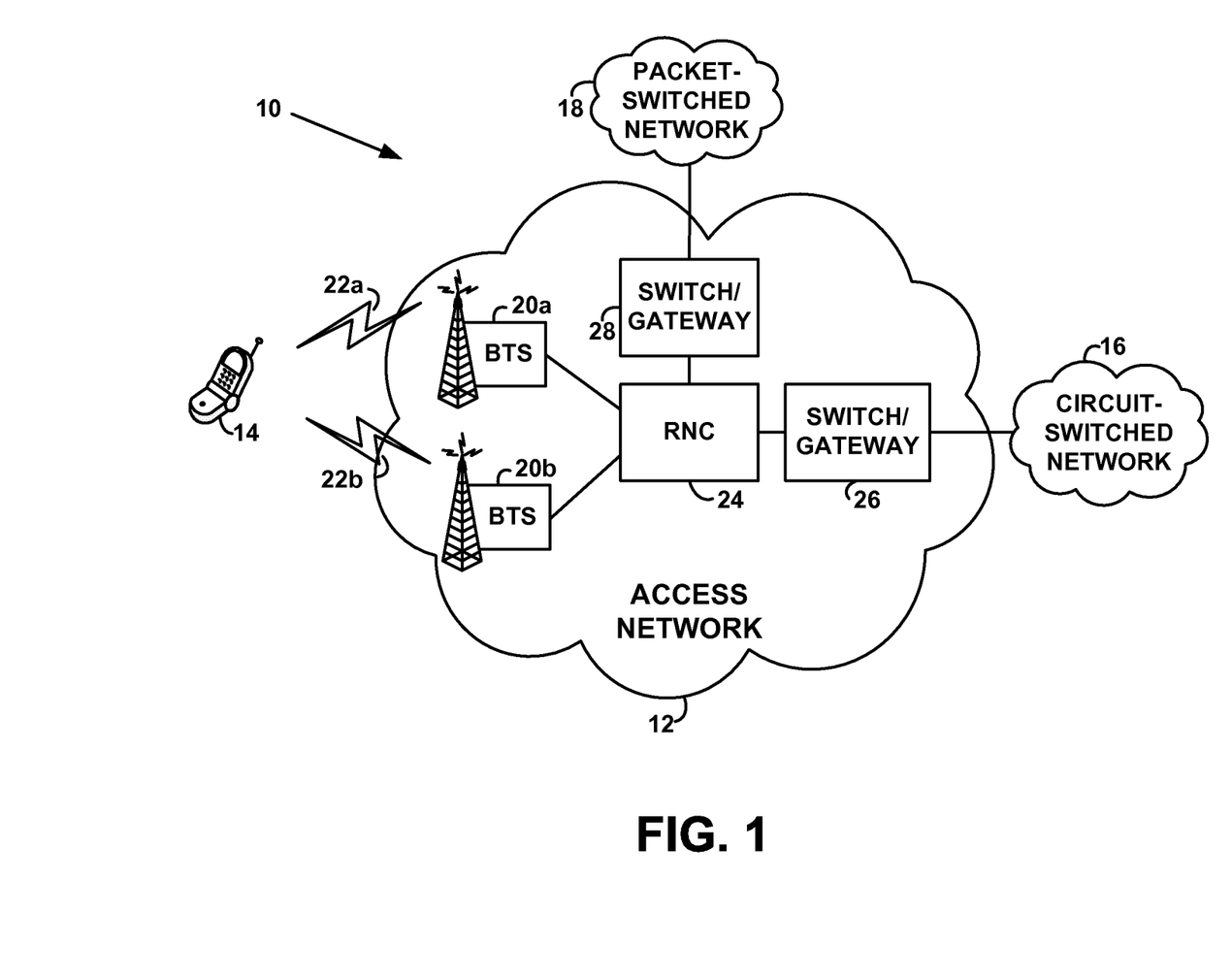
FIG. 1 is a simplified block diagram of a telecommunication system in which an exemplary embodiment of the invention can be implemented.

Referring to the drawings, FIG. 1 is a simplified block diagram of a telecommunications system 10 in which an exemplary embodiment of the invention can be implemented. As shown, the system 10 includes at its core an access network 12, which may function to provide connectivity between one or more access terminals 14 (e.g., a cell phone, PDA, or other wirelessly-equipped device), and one or more transport networks, such as a circuit-switched network 16 (e.g., the public switched telephone network (PSTN)) or a packet-switched network (e.g., the Internet) 18.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, the access network 12 may include a plurality of base transceiver stations (BTSs) 20, such as a first BTS 20a and a second BTS 20b. (Although FIG. 1 depicts the access network 12 as including two BTSs 20, it should be understood that the access network 12 may include more than two BTSs 20). Each BTS 20 of the access network 12 may function to transmit RF-radiation patterns at one or more carrier frequencies, and the RF-radiation patterns may then provide one or more air interfaces 22 over which the access terminals 14 may communicate with the access network 12. For example, each BTS 20 may transmit omni-directional RF-radiation patterns that provide a single air interface 22. Alternatively, each BTS 20 may transmit directional RF-radiation patterns that provide multiple air interfaces 22.

Each of the one or more air interfaces 22 of a given BTS 20, such as the first BTS 20a, may define a corresponding wireless coverage area of the first BTS 20a. For example, if the first BTS 20a provides a single air interface 22, then the first BTS 20a may serve a single wireless coverage area (e.g., a cell). Alternatively, if the first BTS 20a provides multiple air interfaces 22, the first BTS 20a may serve multiple wireless coverage areas (e.g., sectors). In either case, the one or more air interfaces 22 and corresponding wireless coverage areas may be defined by the one or more carrier frequencies of the first BTS 20a and/or a pseudo-random number (PN) offset that distinguishes one wireless coverage area of the first BTS 20a from another.

The air interfaces 22 of the BTSs 20 may carry communications between the access network 12 and access terminals 14 according to any of a variety of protocols. For example, the air interfaces 22 may carry communications according to CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces 22 may also be divided into a plurality of channels for carrying different types of communications between the access terminals 14 and the access network 12. For example, each air interface 22 may include forward-link channels (e.g., control channels, forward-traffic channels, etc.) for carrying forward-link communications from the access network 12 to the access terminals 14, as well as reverse-link channels (e.g., access channels, reverse-traffic channels, etc.) for carrying reverse-link communications from the access terminals 14 to the access network 12.

Each BTS 20 of the access network 12 may then couple to a radio network controller (RNC) 24 (also known as a base station controller (BSC)), which may function to communicate with each BTS 20 and control aspects of the BTSs 20 as well as aspects of the air-interface communication with the access terminals 14. For example, the RNC 24 may control assignment of air-interface traffic channels to access terminals 14. As another example, the RNC 24 may control aspects of a given access terminal 14 switching between coverage areas of the access network 12. Many other examples are possible as well.

Within this arrangement, the BTSs 20 of the access network 12, such as the first BTS 20a and the second BTS 20b, may communicate with each other via the RNC 24. Alternatively, however, the BTSs 20 of the access network 12 may communicate with each other via another entity, or the BTS 20s may communicate with each other directly (e.g., via an air interface or wired link between the BTSs 20).

The RNC 24 may then couple to a switch/gateway 26, such as a mobile switching center (MSC), which may provide connectivity with the circuit-switched network 16. Further, the RNC 24 may couple to a switch/gateway 28, such as a packet data serving node (PDSN), which may provide connectivity with the packet-switched network 18. In this respect, the RNC 24 may additionally include a packet control function ("PCF") for controlling packet-data communications. Accordingly, with this general arrangement, the access network 12 may facilitate communications between two access terminals 14 operating in the access network's coverage areas, and communications between a given access terminal 14 operating in one of the access network's coverage areas and the circuit-switched network 16 or the packet-switched network 18.

In a preferred example, the access terminals 14 will communicate with the access network 12 according to an IS-856 protocol (also known as Evolution-Data Optimized (EV-DO)), such as IS-856 Rel. 0 or IS-856 Rev. A. IS-856 leverages the asymmetric characteristics of most IP traffic, in which a forward link typically carries a higher load than a reverse link. Under IS-856, the forward link of an air interface 22 uses time division multiplexing (TDM), in order to allocate all power in a coverage area to a given user at any moment, while the reverse link of the air interface 22 retains largely the traditional 1xRTT code division multiplexing (CDM) format, albeit with the addition of a "data rate control" (DRC) channel and a "data source control" (DSC) channel, as described in more detail below. As a result of the full-power allocation by the coverage area, an IS-856 access terminal can, in theory, receive packet-data at a rate of at least 38.4 kbps and up to 2.4 Mbps.

The IS-856 forward link of an air interface 22 may be divided into timeslots of length 2048 chips. In turn, each timeslot is further time division multiplexed to carry various channels, including a pilot channel (which carries an indication of PN offset), a Medium Access Control (MAC) channel, and a data channel that may include a forward traffic channel and a "control" channel. The pilot and MAC channels may together be allocated 224 chips twice per time slot (a total of 448 chips) at pre-assigned positions within each time slot (i.e., at pre-assigned phases of each slot). The remaining chips of each timeslot may be allocated for a data channel assigned to a given access terminal 14. In this respect, each timeslot data channel may include a MAC identifier, which the access network 12 uses to distinguish between data channels assigned to different access terminals 14. According to this configuration, the access network 12 typically does not pre-assign or reserve specific timeslot data channels for particular access terminals 14 as part of any type of connection establishment. Instead, the access network 12 typically assigns access terminals a MAC identifier during connection establishment, and then schedules timeslot data channel transmissions dynamically in near-real-time, identifying a recipient by that MAC identifier.

As described above, each wireless coverage area in IS-856 may be defined by one or more carrier frequencies and a PN offset, and the pilot channel of the air interface 22 may carry an indication of this information. An IS-856 access terminal 14 may then measure the pilot signals emitted by the access network 12 for each coverage area detected by the access terminal 14, to determine signal conditions (e.g., measured as a carrier-to-interference (C/I) ratio, or a signal-to-interference-plus-noise ratio (SINR)) of each detected coverage area. The access terminal 14 may then report the signal conditions for each detected coverage area to the access network 12, such as by sending the access network 12 a Route Update Message (also known as a Pilot Strength Measurement Message (PSMM)).

Based on the signal conditions determined by the access terminal 14, the access terminal 14 and/or the access network 12 may generate a dynamic list of "active" coverage areas for the access terminal 14 (known as the access terminal's "active set"), which typically includes the strongest coverage areas of the access network 12 as detected by the access terminal 14. The access terminal's active set may be maintained by both the access terminal 14 and the access network 12, and may include a PN offset and signal strength for each included coverage area (e.g., of which there can be up to three or six according to current standards). The access network 12 may then allocate resources for the access terminal 14 (e.g., a traffic channel identified by MAC identifier) in each coverage area in the active set, and the access terminal 14 may actively monitor the coverage areas in the active set. Thereafter, the active set for the access terminal 14 may be dynamically adjusted to reflect changing air-interface conditions as measured by the access terminal 14.

At any one time, the IS-856 access terminal 14 may then selectively receive communications from a single "serving" coverage area of the access network 12, which the access terminal 14 selects from its active set. In this respect, the access terminal 14 will typically select the strongest coverage area from its active set as the serving coverage area. The access terminal 14 may notify the access network 12 of its selected serving coverage area, and request service in that coverage area, by sending the access network 12 one or more groups of consecutive DRC messages on the reverse-link DRC channel. (It should be understood that each DRC message is sent during a separate timeslot of the reverse-link DRC channel). Each DRC message within a group of consecutive DRC messages may then include (i) a "DRC Cover," which is an indication of the coverage area in which the access terminal 14 wishes to be served, and (ii) a "DRC Rate," which is an indication of the data rate requested by the access terminal 14 in the selected coverage area. The DRC rate may be a value, ranging from 1 to 12, which represents a different data rate (e.g., DRC rate=1 indicates a data rate of 38.4 kbps).

Current IS-856 protocols require that each group of consecutive DRC messages sent by access terminal 14 consist of a specific number of consecutive DRC messages, and that specific number may be referred to as "DRCLength." In this respect, according to current IS-856 protocols, access terminals 14 must send DRC messages in multiples of DRCLength. For example, in IS-856 Rev. A, DRCLength may have a value of 4, in which case the access terminal 14 must send DRC messages to the access network 12 in groups of 4. Further, according to current IS-856 protocols, each DRC message within a given group of consecutive DRC messages must have the same DRC cover and DRC rate. In this respect, current IS-856 access terminals 14 may only change their DRC Cover and/or DRC Rate after sending every DRC message in a given group of DRC messages (i.e., access terminals 14 may only change their DRC Cover and/or DRC Rate every DRCLength consecutive DRC messages).

The serving BTS 20 of the access network 12 may then receive the one or more groups of consecutive DRC messages from the access terminal 14. (It should be understood that other BTSs 20 encompassed by the access terminal's active set may also receive the DRC messages, but only the first serving BTS 20 will decode and process the DRC messages according to the DRC Cover specifying the serving coverage area). Upon and then while receiving the one or more groups of consecutive DRC messages, the serving BTS 20 may serve the access terminal 14 in the specified coverage area until the access terminal 14 selects a different serving coverage area. In this respect, the serving BTS 20 may request the RNC 24 to send the serving BTS 20 any data addressed to the access terminal 14, and the BTS 20 may then send the data addressed to the access terminal 14 over the air interface 22 that defines the serving coverage area during timeslots allocated for the access terminal 14. In turn, the access terminal 14 may receive the data from the serving BTS 20. In this respect, the access terminal may only decode and process transmissions from the access network 12 according to the PN offset of the serving coverage area and the access terminal's MAC identifier. (It should be understood that other BTSs 20 encompassed by access terminal's active set may also be concurrently transmitting data on their respective forward-link channels, but the data will not be intended for the access terminal 14 and the access terminal 14 will not attempt to decode and process these transmissions).

As the access terminal 14 moves through coverage areas of the access network 12 and/or air-interface conditions change, the access terminal 14 may also wish to switch its selection of serving coverage area. In this respect, the access terminal 14 may inform the access network 12 of the access terminal's desire to switch to a new serving coverage area, and the access network 12 may then control the switching of coverage areas by "handing off" service of the access terminal 14 from the current coverage area to the new coverage area without breaking or interrupting current or active communication with the access terminal 14. According to current IS-856 protocols, this switching process may be carried out in a variety of ways.

In one example, the access terminal 14 may request to switch coverage areas of the access network 12 by first sending the access network 12 a predefined number of consecutive DRC messages that include "null-covers," which are special DRC covers that do not specify any coverage area of the access network 12. Current IS-856 protocols require access terminals 14 to send 2*DRCLength consecutive DRC messages (i.e., two groups of DRC messages) with null-covers when requesting a coverage area switch. Upon receiving a first DRC message with the null cover from the access terminal 14, the access network 12, and specifically the serving BTS 20, may then stop serving the access terminal 14 in the current coverage area.

After sending the predefined number (i.e., 2*DRCLength) of consecutive DRC messages with null-covers, the access terminal 14 may then notify the access network 12 of the newly-selected coverage area, and request service in that coverage area, by sending the access network 12 at least a first group of consecutive DRC messages specifying the new coverage area. In turn, the access network 12, and specifically the new BTS 20, may prepare to serve the access terminal 14 in the new coverage area and then begin serving the access terminal 14 in the new coverage area. However, in practice, an undesirable delay may occur before the access network 12 actually begins serving the access terminal 14 in the new coverage area, especially when the access network 12 needs to establish a backhaul connection with and buffer data at a new BTS 20 before serving the access terminal 14 in the new coverage area.

In order to improve the switching process described above, the access terminal 14 may provide the access network 12 with advance notification of a newly selected serving coverage area, and request future service in that coverage area, by sending the access network 12 at least one group of consecutive DSC messages on the reverse-link DSC channel. (It should be understood that because DRC messages and DSC messages occupy different channels, the access terminal 14 may send, and the access network 12 may thus receive, DRC messages and DSC messages substantially simultaneously). Each DSC message within the group of consecutive DSC messages may include a "DSC cover," which is an indication of a data source and corresponding coverage area from which the access terminal 12 desires future service.

Current IS-856 protocols require that each group of consecutive DSC messages sent by access terminal 14 consist of a specific number of consecutive DSC messages, and that specific number may be referred to as "DSCLength." In this respect, according to current IS-856 protocols, access terminals 14 must send DSC messages in multiples of DSCLength. For example, in IS-856 Rev. A, DSCLength may have a value of 64, in which case the access terminal 14 must send DSC messages to the access network 12 in groups of 64. Further, according to current IS-856 protocols, each DSC message within a given group of consecutive DSC messages must have the same DSC cover. In this respect, current IS-856 access terminals 14 may only change their DSC Cover after sending every DSC message in a given group of DSC messages (i.e., access terminals 14 may only change their DSC Cover every DSCLength consecutive DSC messages).

Advantageously, an access terminal 14 may use the DSC channel to notify the access network 12 of an upcoming change to a new data source (e.g., cell) while the access terminal continues to receive data from the current data source. More particularly, while an access terminal 14 is operating in a first coverage area served by a first data source (e.g., BTS 20*a*), the access terminal 14 may point its DRC Cover to the first coverage area and its DSC Cover to the first data source. In turn, the access terminal 14 may send the access network 12 groups of DRC and DSC messages including these DRC and DSC covers and the access network 12 may serve the access terminal 14 in the first coverage area as described above.

Thereafter, the access terminal 14 may wish to switch to a second coverage area served by a second data source (e.g., BTS 20*b*). In this respect, the access terminal 14 may point its DSC cover to the second data source, while keeping its DRC cover pointed to the first coverage area. In turn, the next group of consecutive DSC messages sent by the access terminal 14 may include DSC covers pointed to the second data source. While sending these DSC messages with DSC Covers pointing to the second data source, the access terminal 14 will also continue sending groups of DRC messages with DRC Covers pointing to the first coverage area. Upon receiving the DRC messages specifying the first coverage area and the DSC messages specifying the second data source, the access network 12, and specifically the new data source (e.g., BTS 20*b*), may begin preparing to serve the access terminal 14 (e.g., by establishing a backhaul connection with the RNC 24 and receiving data from the packet-switched network 18), while the first data source continues to serve the access terminal 14 in the first coverage area. Accordingly, the addition of the DSC channel may improve throughput by reducing any delay that may occur while the access terminal 14 switches between coverage areas, and more particularly data sources.

However, according to current IS-856 protocols, an access terminal 14 is not allowed to switch its DRC Cover to a new coverage area until after the access terminal 14 sends every DSC message in the first group of DSC messages specifying the new coverage area. In this respect, the access terminal 14 is required wait at least DSCLength timeslots after first deciding to switch to a new coverage area before the access terminal 14 can begin operating in the new coverage area, regardless of whether the new data source is ready to serve the access terminal in the new coverage area more quickly than that. As a result, there may be an unnecessary delay period between the time the new data source is ready to serve the access terminal 14 in the new coverage area and the time the access terminal 14 can actually begin operating in that new coverage area, during which period the access terminal 14 may be receiving data at a lower data rate. Further, according to current IS-856 protocols, the access terminal 14 must still send 2*DRCLength consecutive DRC messages with null covers before the access terminal 14 can switch its DRC cover to, and thus begin operating in, the new coverage area. As a result, there is still a gap in the access network's service of the access terminal 14 that lasts at least 2*DRCLength timeslots.

Figure 2:
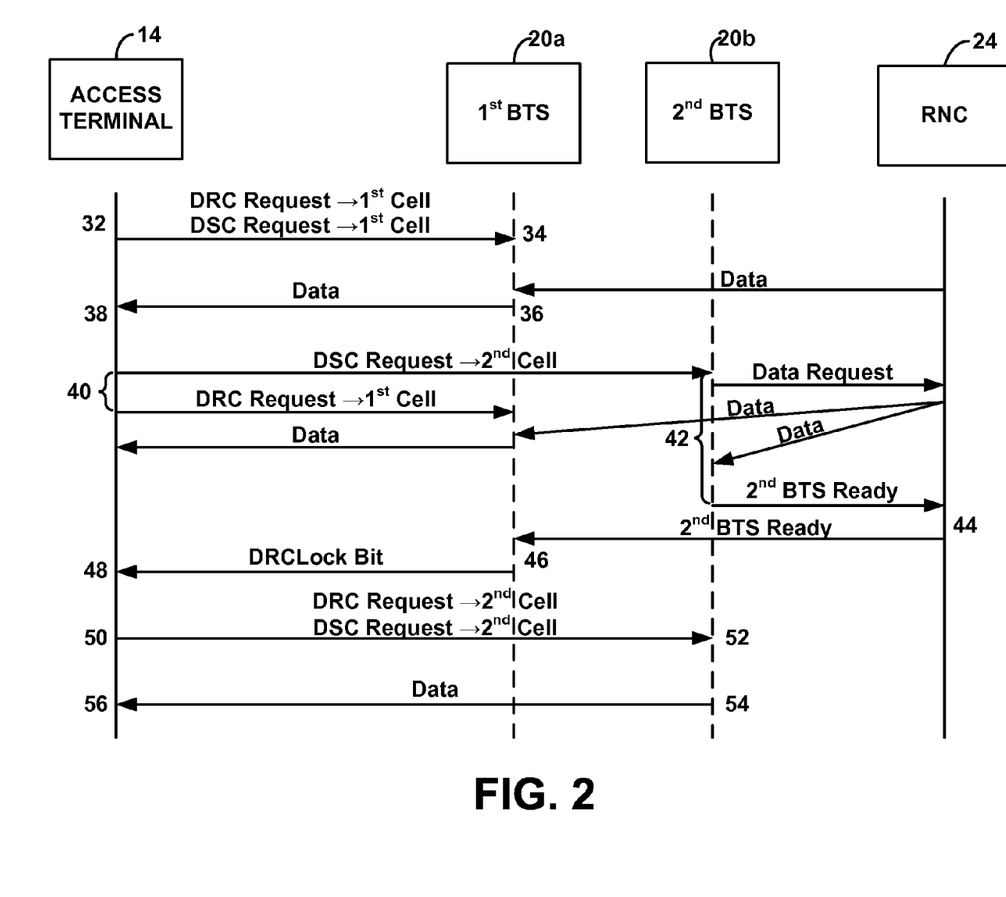
FIG. 2 is a simplified message flow diagram that illustrates an exemplary communication between the access terminal and access network of FIG. 1 for controlling switching of the access terminal between coverage areas of the access network.

FIG. 2 is a simplified message flow diagram that illustrates an exemplary communication between the access terminal 14 and the access network 12 for controlling switching of the access terminal 14 between coverage areas. For purposes of illustration, the following description will assume that the access terminals 14 are communicating with the access network 12 according to an IS-856 protocol. Further, for purposes of illustration, the following description will assume the first BTS 20*a* serves access terminals 14 in a first coverage area (i.e., a first cell) and the second BTS 20*a* serves access terminals in a second coverage area (i.e., a second cell). It should also be understood that each of the first and second coverage areas may be divided into sub-coverage-areas (i.e., sectors), which are distinguished within the cells by PN offsets.

The sequence may begin with the access terminal 14 operating in the first cell of the access network 12. In this respect, the access terminal 14 may have previously determined that the first cell (or a sector thereof) is its strongest detected coverage area (i.e., an air interface 22*a* of the first BTS 20*a* has the best signal conditions of all detected air interfaces 22). While operating in the first cell, the access terminal 12 may point its DRC Cover and DSC Cover to the first cell (or a sector thereof). At step 32, the access terminal 14 operating in the first cell may send to the access network 12 one or more groups of consecutive DRC messages and one or more groups of consecutive DSC messages specifying the first cell (or a sector thereof) as the access terminal's serving coverage area. As described above, each of the groups of DRC messages may consist of DRCLength consecutive DRC messages, and each of the groups of DSC messages may consist of DSCLength consecutive DSC messages.

At step 34, the first BTS 20*a* of the access network 12 may receive the one or more groups of consecutive DRC messages and the one or more groups of consecutive DSC messages from the access terminal 14. (It should be understood that the second BTS 20*b* may also receive the DRC and DSC messages, but only the first BTS 20*a* will decode and process the DRC and DSC messages according to the DRC and DSC covers both specifying the first cell).

At step 36, while receiving the one or more groups of consecutive DRC messages and the one or more groups of consecutive DSC messages specifying the first cell, the first BTS 20*a* may serve the access terminal 14 in the first cell. More particularly, the first BTS 20*a* may send to the access terminal 14 data addressed to the access terminal 14, which the first BTS 20*a* previously received from the RNC 24. In this respect, it should be understood that when the first BTS 20*a* began serving the access terminal 14, the first BTS 20*a* sent a request to the RNC 24 for data addressed to the access terminal 14. In response to receiving that request, the RNC 24 began providing the first BTS 20*a* with data addressed to the access terminal 14 on a rolling basis.

At step 38, the access terminal 14 may receive the data from the first BTS 20*a*. In this respect, as described above, the access terminal 14 may decode and process the data from the first BTS 20*a* according to the PN offset of the first cell (or a sector thereof) and the access terminal's MAC identifier.

At step 40, the access terminal 14 operating in the first cell may then decide to switch from the first cell to the second cell of the access network 12. For example, based on changing air-interface conditions, the access terminal 14 may determine that the second cell (or a sector thereof) is now its strongest detected coverage area. Upon deciding to switch coverage areas, the access terminal 14 may change its DSC Cover such that it points to the second cell. In turn, while continuing to send groups of consecutive DRC messages specifying the first cell (or a sector thereof), the next group of consecutive DSC messages sent by the access terminal 14 to the access network 12 will be a group of consecutive DSC messages specifying the second cell. In this respect, the access terminal 14 may continue operating (e.g., receiving data) in the first cell while the access network 12 handles the access terminal's request to switch cells.

At step 42, while the first BTS 20*a* continues to serve the access terminal 14, the second BTS 20*b* of the access network 12 may receive from the access terminal 14 the group of consecutive DSC messages specifying the second coverage area. (It should be understood that the first BTS 20*a* may also receive the group of consecutive DSC messages specifying the second coverage area, but only the second BTS 20*b* will decode and process the DSC messages according to the DSC cover specifying the second cell). In response to receiving a first DSC message of the group of consecutive DSC messages specifying the second coverage area, the second BTS 20*b* may then begin preparing to serve the access terminal 14 in the second cell. More particularly, the second BTS 20*b* may send a request to the RNC 24 for data addressed to the access terminal 14. In turn, the RNC 24 may begin sending the second BTS 20*b* data addressed to the access terminal 14, which the second BTS 20*b* may receive and store for future transmission to the access terminal 14.

At step 44, the RNC 24 may determine that the second BTS 20*b* has finished preparing to serve the access terminal 14 in the second cell. For example, as shown, the RNC 24 may receive from the second BTS 20*b* a message indicating that the second BTS 20*b* has finished preparing to serve the access terminal. Alternatively, the RNC 24 may determine that the second BTS 20*b* has finished preparing to serve the access terminal 14 based on an amount of data addressed to the access terminal 14 that the RNC 24 has sent to the second BTS 20*b*. In either example, upon determining that the second BTS 20*b* has finished preparing to serve the access terminal 14, the RNC 24 may send the first BTS 20*a* a message indicating that the second BTS 20*b* has finished preparing to serve the access terminal 14 in the second cell.

At step 46, the first BTS 20*a* may receive the message indicating that the second BTS 20*b* has finished preparing to serve the access terminal 14 in the second cell. In turn, the first BTS 20*a* may send the access terminal 14 an IS-856 "DRCLock bit" message, which instructs the access terminal 14 to stop sending DRC messages specifying the first cell (or a sector thereof). After sending the DRCLock bit message, the first BTS 20*a* may send to the RNC 24 a request that the RNC 24 cease sending the first BTS 20*a* data addressed to the access terminal 14. Further, the first BTS 20*a* may cease serving the access terminal 14.

After ceasing to serve the access terminal 14, the first BTS 20*a* may also send the RNC 24 a first indication of when the first BTS 20*a* ceased serving the access terminal 14. In turn, the RNC 24 may receive the first indication and responsively send the second BTS 20*b* a second indication of when the first BTS 20*b* ceased serving the access terminal. The second BTS 20*b* may then receive the second indication and use it to determine when to start serving the access terminal 14 in the second coverage area. In this respect, the first and second indication may each be an indication of a last packet of data sent by the first BTS 20*a* to the access terminal 14.

At step 48, while operating in first cell, the access terminal 14 may receive the DRCLock bit from the first BTS 20*a*. In response, the access terminal 14 may first briefly switch its DRC cover to the null-cover and send the access network 12 less than 2*DRCLength consecutive DRC messages with the null-cover. However, in a preferred example, the access terminal 14 will not switch its DRC cover to the null-cover, in which case the access terminal 14 will not send the access network 12 any DRC messages with null-covers.

At step 50, the access terminal 14 may then begin operating in the second cell. More particularly, the access terminal 14 may first switch its DRC cover such that it points to the second cell (or a sector thereof). In turn, the access terminal 14 may send the access network 12 one or more groups of consecutive DRC messages specifying the second cell (or a sector thereof). Preferably, the access terminal 14 will send a first message in the one or more groups of consecutive DRC messages specifying the second coverage area, and thus begin operating in the second coverage area, before the access terminal 14 sends a last message (i.e., the DSCLength message) in the first group of consecutive DSC messages specifying the second coverage area. Further, in one example, the last group of consecutive DRC messages specifying the first cell sent by the access terminal 14 may consist of less than DRCLength consecutive DRC messages. In this respect, the access terminal 14 may no longer be required to send every DRC message in the last group of consecutive DRC messages specifying the first cell before switching its DRC cover to, and thus operating in, the second cell.

DRC messages. In this respect, the access terminal 14 may no longer be required to send every DRC message in the last group of consecutive DRC messages specifying the first cell before switching its DRC cover to, and thus operating in, the second cell.

At step 52, the second BTS 20*b* may then receive the one or more groups of consecutive DRC messages specifying the second cell (or a sector thereof). In turn, at step 54, the second BTS 20*b* may responsively begin serving the access terminal 14 in the second cell. More particularly, the second BTS 20*b* may send the previously stored data to the access terminal 14 over an air interface 22*b* that defines the second cell (or a sector thereof). In this respect, the first packet sent by the second BTS 20*b* will preferably be a packet that immediately follows the last packet sent by the first BTS 20*a*.

At step 56, the access terminal 14 operating in the second cell may then receive the data from the second BTS 20*b*. In this respect, the access terminal 14 may decode and process the data from the second BTS 20*b* according to the PN offset of the second cell (or a sector thereof) and the access terminal's MAC identifier.

Advantageously, the exemplary communication described above for controlling switching of the access terminal 14 between coverage areas of the access network 12 may improve throughput of the access network 12 during the switching process. For example, the access terminal 14 may no longer have to wait a predefined number of timeslots (e.g., DSCLength) before switching to the new, stronger cell, and may instead switch to that new cell as soon as the new BTS 20 is ready to serve the access terminal 14 in the new cell. In this respect, the access terminal 14 may then be able to receive data at a higher data rate from the new, stronger cell. As another example, the access terminal 14 may no longer be required to send DRC messages with null-covers to the access network 12 before switching to the new, stronger cell, thus enabling the access network 12 to serve to the access terminal 14 more continuously throughout the switching process.

Figure 3:
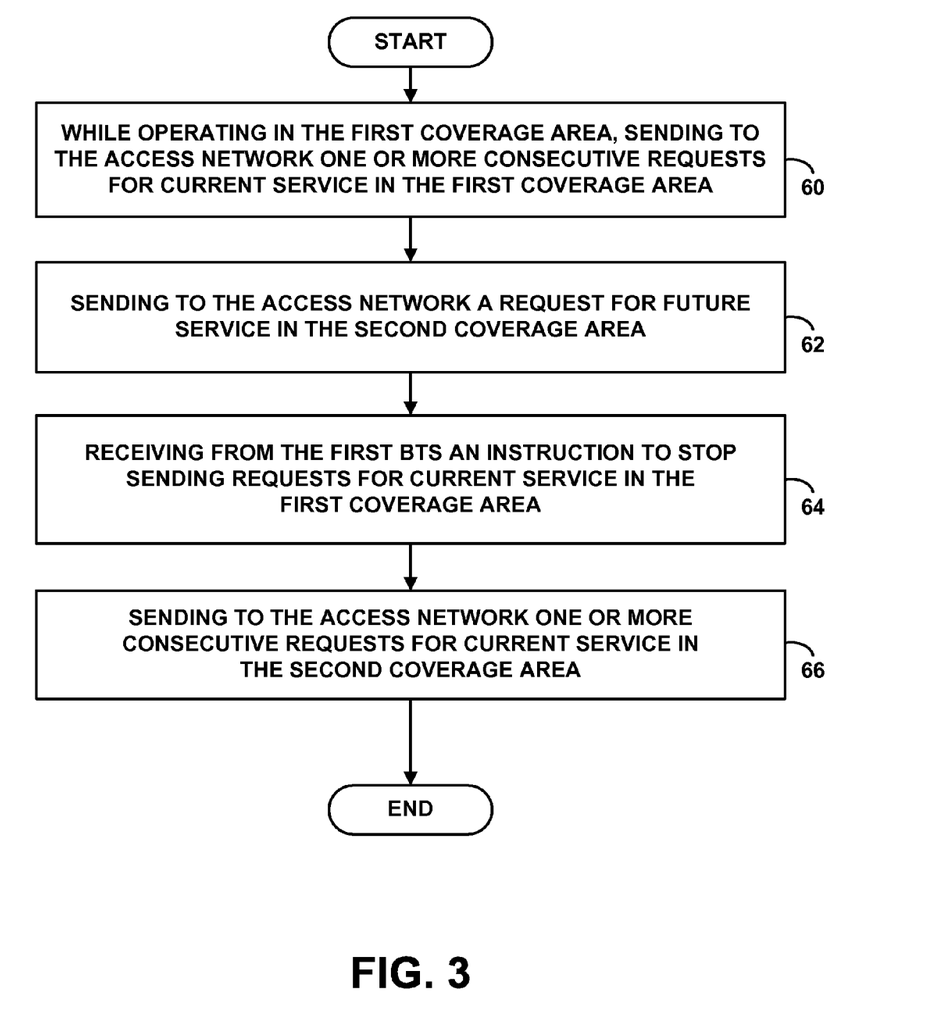
FIG. 3 is a flow chart depicting a method, carried out by an access terminal, for switching between coverage areas of an access network.

FIG. 3 is a flow chart depicting a method, carried out by the access terminal 14, for switching between coverage areas of an access network 12. As above, the following description will assume that the first BTS 20*a* serves access terminals in the first coverage area and the second BTS 20*b* serves access terminals 14 in the second coverage area.

The method may begin at step 60 with the access terminal 14 operating in the first coverage area and sending to the access network 12 one or more consecutive requests for current service in the first coverage area, which the second BTS 20*b* may receive. In this respect, the first BTS 20*a* may begin serving the access terminal 14 in response to receiving a first such request. (It should be understood that the first BTS 20*a* may receive a first such request, and thus begin serving the access terminal 14 in the first coverage area, before step 60). In a preferred example, each of the requests for current service in the first coverage area will be a group of consecutive IS-856 DRC messages specifying the first coverage area. While sending the one or more consecutive requests for current service in the first coverage area, the access terminal 14 may receive data from the first BTS in the first coverage area.

At step 62, while sending the one or more consecutive requests for current service in the first coverage area, the access terminal 14 sends to the access network 12 a request for future service in the second coverage area, which the second BTS 20*b* receives. The second BTS 20*b* then responsively prepares to serve the access terminal 14 in the second coverage area. In a preferred example, the request for future service in the second coverage area will be a group of consecutive IS-856 DSC messages specifying the second coverage area.

At step 64, the access terminal 14 receives from the first BTS 20*a* an instruction to stop sending requests for current service in the first coverage area. In a preferred example, the instruction will be an IS-856 DRCLock bit message.

At step 66, in response to receiving the instruction, the access terminal 14 sends to the access network 12 one or more consecutive requests for current service in the second coverage area, which second BTS 20*b* may then receive. In a preferred example, each of the requests for current service in the second coverage area will be a group of consecutive IS-856 DRC messages specifying the second coverage area. While sending the one or more consecutive requests for current service in the second coverage area, the access terminal 14 may receive data from the second BTS 20*b* in the second coverage area.

In one example, where the group of consecutive IS-856 DSC messages specifying the second coverage area consists of DSCLength consecutive IS-856 DSC messages, the access terminal may send a first DRC message of the one or more groups of consecutive IS-856 DRC messages specifying the second coverage area before sending a last message in the group of DSCLength consecutive IS-856 DSC messages specifying the second coverage area. In another example, a last group of the one or more groups of consecutive IS-856 DRC messages specifying the first coverage area may consist of less than DRCLength consecutive IS-856 DRC messages specifying the first coverage area.

In yet another example, before sending the one or more groups of consecutive IS-856 DRC messages specifying the second coverage area, the access terminal 14 may send to the access network 12 a non-negative number of consecutive IS-856 DRC messages that include a null-cover, where the non-negative number is less than 2*DRCLength. Preferably, the access terminal 14 will not send any IS-856 DRC messages that include a null-cover (i.e., the non-negative number of consecutive IS-856 DRC messages that include a null-cover will be zero)

Figure 4:
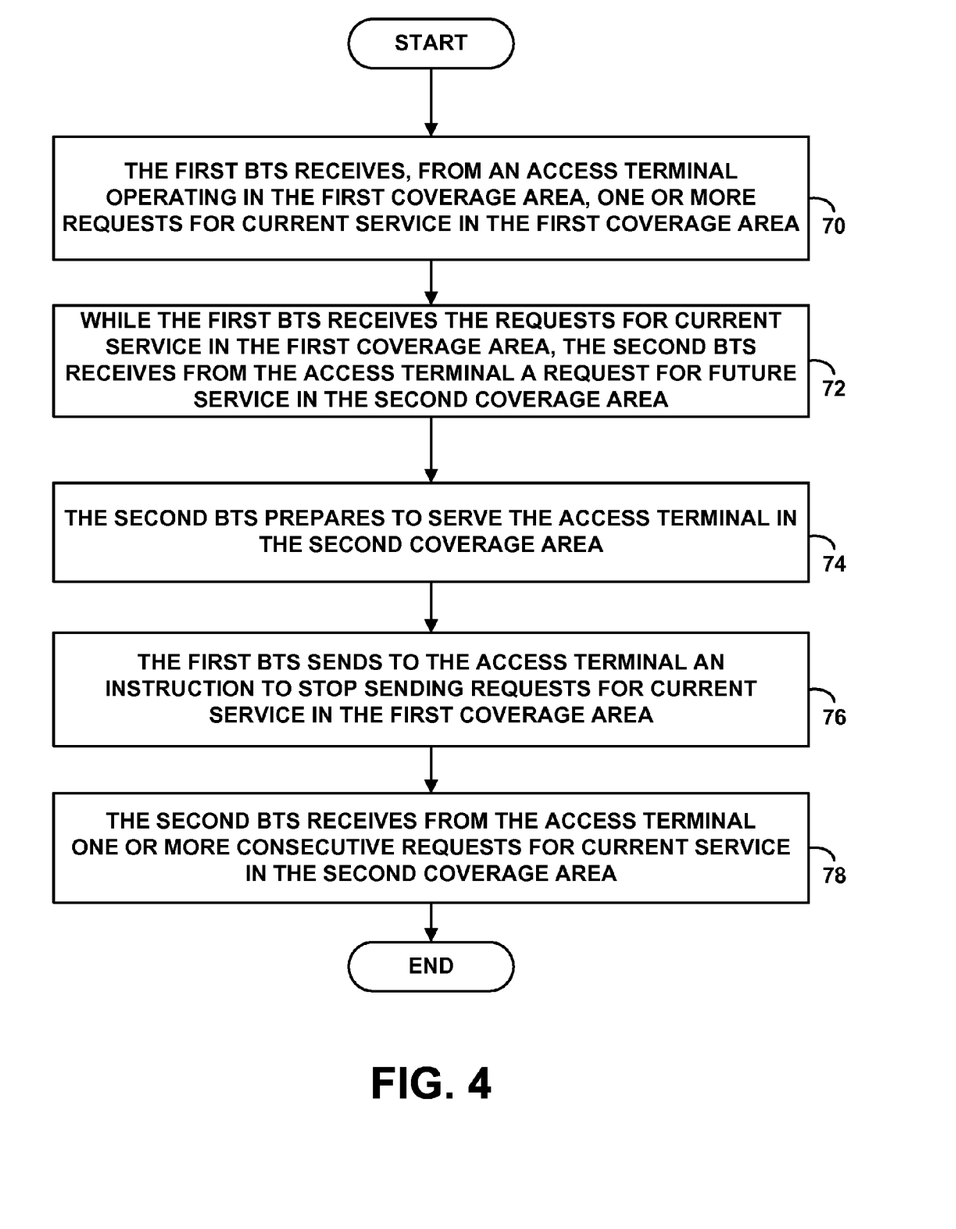
FIG. 4 is a flow chart depicting a method, carried out by an access network, for controlling switching of an access terminal between coverage areas of the access network.

FIG. 4 is a flow chart depicting a method, carried out by the access network 12, for controlling switching of the access terminal 14 between coverage areas of the access network 12. As above, the following description will assume that the first BTS 20*a* serves access terminals in the first coverage area and the second BTS 20*b* serves access terminals 14 in the second coverage area.

The method begins at step 70 with the access terminal 14 operating in the first coverage area and the first BTS 20*a* receiving from the access terminal 14 one or more requests for current service in the first coverage area, where the first BTS 20*a* begins serving the access terminal 14 in the first coverage area in response to receiving a first such request. (It should be understood that the first BTS 20*a* may receive a first such request, and thus begin serving the access terminal 14 in the first coverage area, before step 70). In a preferred example, each of the requests for current service in the first coverage area will be a group of consecutive IS-856 DRC messages specifying the first coverage area. While the first BTS 20*a* serves the access terminal 14, the RNC 24 may send the first BTS 20*a* data addressed to the access terminal 14, which the first BTS receives and then responsively sends to the access terminal 14.

At step 72, while the first BTS 20*a* is receiving the one or more consecutive requests for current service in the first coverage area, the second BTS 20*b* receives from the access terminal 14 a request for future service in the second coverage area. In a preferred example, the request for future service in the second coverage area will be a group of consecutive IS-856 DSC messages specifying the second coverage area. In this respect, the group of consecutive IS-856-DSC messages specifying the second coverage area may consist of DSCLength consecutive IS-856 DSC messages.

At step 74, in response to receiving the request for future service in the second coverage area, the second BTS 20*b* will prepare to serve the access terminal 14 in the second coverage area. In this respect, if the request for future service in the second coverage area is the group of consecutive IS-856 DSC messages specifying the second coverage area, the second BTS 20*b* will prepare to serve the access terminal 14 in the second coverage area in response to receiving a first message of the IS-856 DSC messages specifying the first coverage area.

In one example, the second BTS 20*b* may prepare to serve the access terminal 14 in the second coverage area by (i) requesting, from the RNC 24, data addressed to the access terminal 14, (ii) receiving, from the RNC 24, the data addressed to the access terminal 14, and (iii) storing the data addressed to the access terminal 14. In this respect, once the second BTS 20*b* begins serving the access terminal 14 (as described below), the second BTS 20*b* may send the stored data to the access terminal 14.

In another example, after the second BTS 20*b* has finished preparing to serve the access terminal 14, the RNC 24 may determine that the second BTS 20*b* has finished preparing to serve the access terminal 14 and send to the first BTS 20*a* an indication that the second BTS 20*b* has finished preparing to serve the access terminal 14, which the first BTS 20*a* then receives. The RNC 24 may determine that the second BTS 20*b* has finished preparing to serve the access terminal 14 by receiving from the second BTS 20*b* an indication that the second BTS 20*b* has finished preparing to serve the access terminal 14.

At step 76, after the second BTS 20*b* has finished preparing to serve the access terminal 14, the first BTS 20*a* sends to the access terminal 14 an instruction to stop sending requests for current service in the first coverage area. In a preferred example, the instruction is an IS-856 DRCLock bit message. In another example, the first BTS 20*a* may send the IS-856 DRCLock bit message in response to receiving an indication that the second BTS 20*b* has finished preparing to serve the access terminal 14. The first BTS 20*a* may receive this indication from the RNC 24, as described above, or the first BTS 20*a* may receive this indication directly from the second BTS 20*b* (e.g., via an air interface or wired link between the first BTS 20*a* and the second BTS 20*b*).

In a further example, in response to sending the instruction, the first BTS 20*a* may cease serving the access terminal 14 in the first coverage area. In this respect, after the first BTS 20*a* ceases serving the access terminal 14 in the first coverage area, the first BTS 20*a* may inform the second BTS 20*b* (e.g., either directly or indirectly) of when the first BTS 20*a* ceased serving the access terminal, which may assist the second BTS 20*b* in determining when to begin serving the access terminal 14. For example, the first BTS 20*a* may send an indication of when the first BTS ceased serving the access terminal 14 directly to the second BTS 20*b*, and the second BTS 20*b* may receive the indication and use it to determine when to start serving the access terminal 14. As another example, (i) the first BTS 20*a* may send to the RNC 24 a first indication of when the first BTS ceased serving the access terminal 14, (ii) the RNC 24 may receive the first indication and responsively send to the second BTS 20*b* a second indication of when the first BTS 20*a* ceased serving the access terminal 14, and (iii) the second BTS 20*b* may receive the second indication and use it to determine when to start serving the access terminal 14. Each of the indications described above may be an indication of a last packet sent by the first BTS 20*a* to the access terminal 14.

In still a further example, in response to sending the instruction, the first BTS 20*a* may send to the RNC 24 a request that the RNC 24 cease sending the first BTS 20*a* the data addressed to the access terminal 14, where the RNC 24 receives the request and responsively ceases sending the first BTS 20*a* the data addressed to the access terminal 14.

At step 78, after the first BTS 20*a* sends the instruction, the second BTS 20*b* receives from the access terminal 14 one or more consecutive requests for current service in the second coverage area, where the second BTS begins serving the access terminal in the second coverage area in response to receiving a first such request. In a preferred example, each of the requests for current service in the second coverage area will be a group of consecutive IS-856 DRC messages specifying the second coverage area. In this respect, where the group of consecutive IS-856 DSC messages specifying the second coverage area consists of DSCLength consecutive IS-856 DSC messages, the second BTS 20*b* may then receive a first message in the one or more groups of consecutive IS-856 DRC messages specifying the second coverage area before the second BTS 20*b* receives a last message in the group of DSCLength consecutive IS-856 DSC messages specifying the second coverage area.

In another example, before the second BTS 20*b* receives a first message in the one or more consecutive groups of consecutive IS-856 DRC messages specifying the second coverage area, the first BTS 20*a* may receive from the access terminal 14 a non-negative number of consecutive IS-856 DRC messages that include a null-cover, where the non-negative number is less than 2*DRCLength. In a preferred example, the first BTS 20*a* will not receive any IS-856 DRC messages that include a null-cover (i.e., the non-negative number will be zero).

Figure 5:
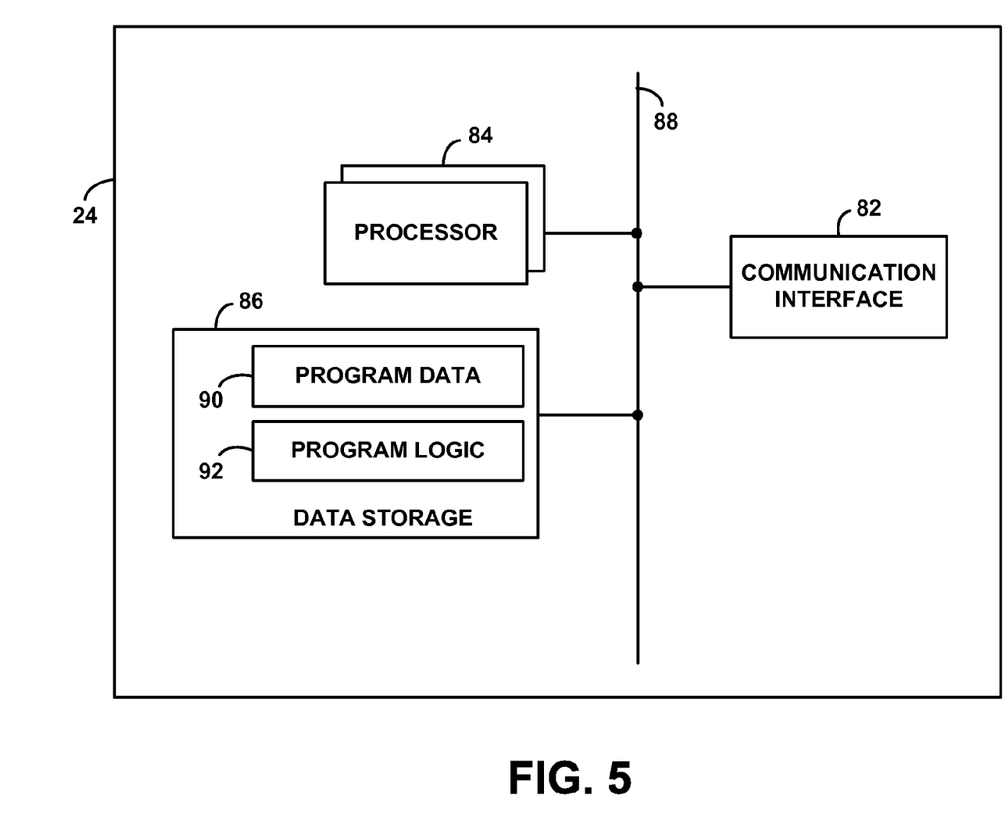
FIG. 5 is a simplified block diagram of an exemplary radio network controller, showing functional components that can operate to carry out aspects of the present invention.

FIG. 5 is a simplified block diagram of an exemplary RNC 24, showing functional components that can operate to carry out aspects of the present invention. As shown in FIG. 5, the RNC 24 may include a communication interface 82, a processor 84, and data storage 86, all linked together via a system bus, network, or other connection mechanism 88.

Referring to FIG. 5, the communication interface 82 preferably functions to communicatively couple the RNC 24 to other entities of the system 10, such as the first BTS 20*a* (which serves access terminals 14 in the first cell), the second BTS 20*b* (which serves access terminals 14 in the second cell), the circuit-switched network 16, and the packet-switched network 18. As such, the communication interface 82 may take the form of an Ethernet network interface card, a chipset and antenna adapted to facilitate wireless communication according a desired protocol, and/or any other form that provides for wired and/or wireless communication with other entities. The communication interface 82 may also include multiple communication interfaces, such as one communication interface for each entity with which the RNC 24 communicates. Other configurations are also possible.

The processor 84 may comprise one or more general purpose microprocessors and/or dedicated signal processors. (The term "processor" encompasses either a single processor or multiple processors that could work in combination.) Data storage 86, in turn, may comprise memory and/or other storage components, such as optical, magnetic, organic or other memory or disk/disc storage, which can be volatile and/or non-volatile, internal and/or external, and integrated in whole or in part with the processor 84. Data storage 86 preferably contains or is arranged to contain (i) program data 90 and (ii) program logic 92. Although these components are described herein as separate data storage elements, the elements could just as well be physically integrated together or distributed in various other ways. In a preferred example, the program data 90 would be maintained in data storage 86 separate from the program logic 92, for easy updating and reference by the program logic 92.

Program data 90 may contain information about the BTSs 20, the coverage areas, the access terminals 14, and/or air-interface communications with the access terminals 14. For example, program data may contain identifying information for the BTSs 20 and their coverage areas (e.g., BSID, carrier frequency, PN offsets, etc.). As another example, for each access terminal 14 operating in the access network 12, the program data 90 may contain identifying information (e.g., MINs, IMSIs, and/or UATIs), coverage area information (e.g., the access terminals' active sets), and/or assigned network resource information (e.g., MAC identifiers). Many other examples are possible as well.

Program logic 92 preferably comprises machine-language instructions that may be executed or interpreted by processor 84 to carry out functions according to examples of the present invention, including the functions described with reference to FIG. 4. It should be understood, however, that the program logic 92 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 92 may be executable by the processor 84 to facilitate switching of the access terminal 14 between coverage areas of the access network 12, according to an example of the present invention. In this respect, the program logic 92 may be executable by the processor 84 to (a) receive from the first BTS 20*a* a first request for data addressed to the access terminal 14, (b) send to the first BTS 20*a* the data addressed to the access terminal 14 in response to receiving the first request, (c) receive from the second BTS 20*b* a second request for data addressed to the access terminal 14 after starting to send the data to the first BTS 20*a*, (d) send to the second BTS 20*b* the data addressed to the access terminal 14 in response to receiving the second request, (e) determine that the second BTS 20*b* has finished preparing to serve the access terminal 14, (f) send to the first BTS 20*a* an indication that the second BTS 20*b* has finished preparing to serve the access terminal 14, (g) receive from the first BTS 20*a* a third request to cease sending the first BTS 20*a* the data addressed to the access terminal 14, and (h) responsively cease sending the first BTS 20*a* the data addressed to the access terminal 14.

In another example, the program logic 92 may be executable by the processor 84 to receive from the first BTS 20*a* a first indication of when the first BTS 20*a* stopped serving the access terminal 14 and send to the second BTS a second indication of when the first BTS stopped serving the access terminal. In yet another example, the program logic 92 may be executable by the processor 84 to request, from the packet-switched network 18, data addressed to the access terminal, and receive from the packet-switched network 18 the data addressed to the access terminal.

Exemplary embodiments of the present invention have been described above. Those skilled in the art will understand, however, that changes and modifications may be made to the embodiments described without departing from the true scope and spirit of the present invention, which is defined by the claims.

We claim:

1. A method for controlling switching of an access terminal between coverage areas of an access network, the method comprising:
   a first base transceiver station (BTS) receiving, from an access terminal operating in a first coverage area, one or more consecutive requests for current service in the first coverage area, wherein the first BTS begins serving the access terminal in the first coverage area in response to receiving a first such request;
   while the first BTS is receiving the one or more consecutive requests for current service in the first coverage area, a second BTS receiving from the access terminal a request for future service in a second coverage area and responsively beginning to receive data addressed to the access terminal;
   a radio network controller (RNC) determining that the second BTS has received a threshold amount of data addressed to the access terminal and in response to the determining, the RNC sending to the first BTS an indication that the second BTS has received the threshold amount of data addressed to the access terminal;
   the first BTS thereafter receiving the indication that the second BTS has received the threshold amount of data addressed to the access terminal and in response to receiving the indication, the first BTS sending to the access terminal an instruction to stop sending requests for current service in the first coverage area; and
   after the first BTS sends the instruction, the second BTS receiving from the access terminal one or more consecutive requests for current service in the second coverage area, wherein the second BTS begins sending the data addressed to the access terminal in the second coverage area in response to a first such request.

2. The method of claim 1, wherein:
   each of the requests for current service in the first coverage area comprises a group of consecutive IS-856 Data Rate Control (DRC) messages specifying the first coverage area,
   the request for future service in the second coverage area comprises a group of consecutive IS-856 Data Source Control (DSC) messages specifying the second coverage area,
   the instruction to stop sending requests for current service in the first coverage area comprises an IS-856 DRCLock bit message, and
   each of the requests for current service in the second coverage area comprises a group of consecutive IS-856 DRC messages specifying the second coverage area.

3. The method of claim 2, wherein the second BTS receiving from the access terminal a request for future service in a second coverage area comprises the second BTS receiving from the access terminal a first message in the group of consecutive IS-856 DSC messages specifying the second coverage area.

4. The method of claim 2, wherein the group of consecutive IS-856 DSC messages specifying the second coverage area consists of DSCLength consecutive IS-856 DSC messages specifying the second coverage area, and wherein the second BTS receiving from the access terminal the one or more consecutive groups of consecutive IS-856 DRC messages specifying the second coverage area comprises the second BTS receiving from the access terminal a first message in the one or more consecutive groups of consecutive IS-856 DRC messages specifying the second coverage area before the second BTS receives a last message in the group of consecutive IS-856 DSC messages specifying the second coverage area.

5. The method of claim 2, further comprising:
   before the second BTS receives a first message in the one or more consecutive groups of consecutive IS-856 DRC messages specifying the second coverage area, the first BTS receiving from the access terminal a non-negative number of consecutive IS-856 DRC messages that include a null-cover, wherein the non-negative number is less than 2*DRCLength.

6. The method of claim 5, wherein the non-negative number is zero.

7. The method of claim 1, wherein the second BTS beginning to receive data directed to the access terminal comprises:
   requesting, from the RNC, data addressed to the access terminal; and
   as a result of the requesting, receiving, from the RNC, the data addressed to the access terminal.

8. The method of claim 1, wherein the first BTS ceases serving the access terminal in the first coverage area after sending the instruction.

9. The method of claim 8, further comprising:
   the first BTS sending to the RNC a first indication of when the first BTS ceased serving the access terminal;
   the RNC receiving the first indication, and responsively sending to the second BTS a second indication of when the first BTS ceased serving the access terminal; and the second BTS receiving the second indication, and responsively using the second indication to determine when to start sending the data addressed to the access terminal.

10. The method of claim 9, wherein the first indication and the second indication each comprise an indication of a last packet sent by the first BTS to the access terminal.

11. The method of claim 1, wherein the RNC determining that the second BTS has received the threshold amount of data addressed to the access terminal comprises:
the RNC determining that the second BTS has received the threshold amount of data addressed to the access terminal based on a message received from the second BTS.

12. A method, carried out by an access terminal, for switching between coverage areas of an access network, the method comprising:
sending to an access network one or more consecutive requests for current service in a first coverage area, wherein a first base transceiver station (BTS) receives the one or more consecutive requests and begins serving the access terminal in the first coverage area in response to receiving a first such request;
while sending the one or more consecutive requests for current service in the first coverage area, sending to the access network a request for future service in a second coverage area, wherein a second BTS receives the request for future service in the second coverage area and responsively begins to receive data addressed to the access terminal;
receiving from the first BTS an instruction to stop sending requests for current service in the first coverage area, wherein the first BTS sends the instruction as a result of a radio network controller (RNC) determining that the second BTS has received a threshold amount of data addressed to the access terminal and the RNC then responsively sending to the first BTS an indication that the second BTS has received the threshold amount of data addressed to the access terminal; and
in response to receiving the instruction, sending to the access network one or more consecutive requests for current service in the second coverage area, wherein the second BTS receives the one or more consecutive requests and begins sending the data addressed to the access terminal in the second coverage area in response to receiving a first such request.

13. The method of claim 12, wherein:
each of the requests for current service in the first coverage area comprises a group of consecutive IS-856 Data Rate Control (DRC) messages specifying the first coverage area,
the request for future service in the second coverage area comprises a group of consecutive IS-856 Data Source Control (DSC) messages specifying the second coverage area,
the instruction to stop sending requests for current service in the first coverage area comprises an IS-856 DRCLock bit message, and
each of the requests for current service in the second coverage area comprises a group of consecutive IS-856 DRC messages specifying the second coverage area.

14. The method of claim 13, wherein a last group of the one or more consecutive groups of consecutive IS-856 DRC messages specifying the first coverage area consists of less than DRCLength consecutive IS-856 DRC messages specifying the first coverage area.

15. The method of claim 13, wherein the group of consecutive IS-856 DSC messages specifying the second coverage area consists of DSCLength consecutive IS-856 DSC messages specifying the second coverage area, and wherein sending to the access network the one or more consecutive groups of consecutive IS-856 DRC messages specifying the second coverage area comprises sending a first message in the one or more consecutive groups of consecutive IS-856 DRC messages specifying the second coverage area before sending a last message in the group of consecutive IS-856 DSC messages specifying the second coverage area.

16. The method of claim 13, further comprising:
before sending the one or more consecutive groups of consecutive IS-856 DRC messages specifying the second coverage area, sending to the access network a non-negative number of consecutive IS-856 DRC messages that include a null-cover, wherein the non-negative number is less than 2*DRCLength.

17. The method of claim 16, wherein the non-negative number is zero.

18. A radio network controller (RNC) comprising:
a communication interface coupled to (i) a first base transceiver station (BTS) that serves access terminals in a first coverage area and (ii) a second BTS that serves access terminals in a second coverage area;
a processor;
data storage; and
program instructions stored in the data storage and executable by the processor for:
receiving from the first BTS a first request for data addressed to an access terminal operating in the first coverage area, wherein the first BTS sends the first request in response to receiving from the access terminal a first of one or more consecutive requests for current service in the first coverage area;
in response to receiving the first request from the first BTS, starting to send to the first BTS the data addressed to the access terminal, wherein the first BTS responsively sends the data to the access terminal;
after starting to send the data to the first BTS, receiving from the second BTS a second request for data addressed to the access terminal, wherein the second BTS sends the second request in response to receiving from the access terminal a request for future service in the second coverage area;
in response to receiving the second request, starting to send to the second BTS data addressed to the access terminal;
determining that the second BTS has received a threshold amount of data addressed to the access terminal;
in response to determining that the second BTS has received the threshold amount of data addressed to the access terminal, sending to the first BTS an indication that the second BTS has received the threshold amount of data addressed to the access terminal, wherein the first BTS receives the indication and responsively sends the access terminal an instruction to stop sending requests for service in the first coverage area; and
receiving from the first BTS a third request to cease sending the first BTS the data addressed to the access terminal, and responsively ceasing to send the first BTS the data addressed to the access terminal.

19. The RNC of claim 18, wherein:
each of the requests for current service in the first coverage area comprises a group of consecutive IS-856 Data Rate Control (DRC) messages specifying the first coverage area, the request for future service in the second coverage area comprises a group of consecutive IS-856 Data Source Control (DSC) messages specifying the second coverage area, and the instruction to stop sending requests for current service in the first coverage area comprises an IS-856 DRCLock bit message.

20. The RNC of claim 18, further comprising program instructions stored in the data storage and executable by the processor for:

receiving from the first BTS a first indication of when the first BTS ceased serving the access terminal; and sending to the second BTS a second indication of when the first BTS ceased serving the access terminal, wherein the second BTS receives the second indication and uses the second indication to determine when to begin sending data addressed to the access terminal.

21. The RNC of claim 18, wherein the communication interface is further coupled to a packet-switched network, the RNC further comprising program instructions stored in the data storage and executable by the processor for:

requesting, from the packet-switched network, data addressed to the access terminal; and receiving, from the packet-switched network, the data addressed to the access terminal.

\* \* \* \* \*